(12) United States Patent
Abe et al.

(10) Patent No.: US 6,381,208 B1
(45) Date of Patent: Apr. 30, 2002

(54) OPTICAL RECORDING MEDIUM AND OPTICAL RECORDING AND REPRODUCING APPARATUS

(75) Inventors: Kazutaka Abe, Kitakatsuragi-gun; Tetsuo Iwaki, Yamatokoriyama, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/565,950

(22) Filed: May 5, 2000

(30) Foreign Application Priority Data

May 6, 1999 (JP) .......................................... 11-125589

(51) Int. Cl.$^7$ ................................................ G11B 7/00
(52) U.S. Cl. ............................... 369/112.01; 369/275.3; 369/52.1
(58) Field of Search ............................ 369/275.3, 52.1, 369/53.1, 53.2, 53.44

(56) References Cited

U.S. PATENT DOCUMENTS 6,243,327 B1 * 12/1999 Nakaoki et al. .............. 369/13

FOREIGN PATENT DOCUMENTS

JP           9-251645           9/1997

* cited by examiner

*Primary Examiner*—Nabil Hindi
(74) *Attorney, Agent, or Firm*—David G. Conlin; Dike, Bronstein, Roberts & Cushman/IP Practice Group of Edwards & Angell (57) ABSTRACT

Thickness information and refractive index information of a light transmitting layer are recorded in advance on an optical recording medium. Based on the thickness information and the refractive index information of the light transmitting layer, space between two lens units of an objective lens system is adjusted in an optical recording and reproducing apparatus, so that spherical aberration is adjusted. Accordingly, in the optical recording and reproducing apparatus using two lens units, it becomes possible to correctly record or reproduce the information to and from the optical recording medium.

8 Claims, 7 Drawing Sheets

| MATERIAL OF LIGHT TRANSMITTING LAYER | REFRACTIVE INDEX |
|---|---|
| PC (POLYCARBONATE) | n=1.58 |

| THICKNESS OF LIGHT TRANSMITTING LAYER (mm) | SPHERICAL ABERRATION ($\lambda$ rms) | LENS SPACE (mm) |
|---|---|---|
| 0.01 | 0.06 | 1.696 |
| 0.02 | 0.054 | 1.677 |
| 0.03 | 0.047 | 1.658 |
| 0.04 | 0.041 | 1.638 |
| 0.05 | 0.034 | 1.619 |
| 0.06 | 0.028 | 1.599 |
| 0.07 | 0.021 | 1.578 |
| 0.08 | 0.014 | 1.558 |
| 0.09 | 0.008 | 1.537 |
| 0.1 | 0.008 | 1.515 |
| 0.11 | 0.014 | 1.493 |
| 0.12 | 0.022 | 1.471 |
| 0.13 | 0.031 | 1.449 |
| 0.14 | 0.041 | 1.426 |
| 0.15 | 0.051 | 1.403 |
| 0.16 | 0.061 | 1.380 |
| 0.17 | 0.073 | 1.356 |
| 0.18 | 0.085 | 1.332 |
| 0.19 | 0.098 | 1.308 |
| 0.2 | 0.111 | 1.283 |

| MATERIAL OF LIGHT TRANSMITTING LAYER | REFRACTIVE INDEX |
|---|---|
| PMMA (ACRYLIC RESIN) | n=1.49 |

| THICKNESS OF LIGHT TRANSMITTING LAYER (mm) | SPHERICAL ABERRATION ($\lambda$ rms) | LENS SPACE (mm) |
|---|---|---|
| 0.01 | 0.06 | 1.695 |
| 0.02 | 0.054 | 1.676 |
| 0.03 | 0.048 | 1.657 |
| 0.04 | 0.042 | 1.637 |
| 0.05 | 0.036 | 1.617 |
| 0.06 | 0.03 | 1.597 |
| 0.07 | 0.023 | 1.576 |
| 0.08 | 0.016 | 1.555 |
| 0.09 | 0.01 | 1.534 |
| 0.1 | 0.007 | 1.512 |
| 0.11 | 0.01 | 1.490 |
| 0.12 | 0.018 | 1.467 |
| 0.13 | 0.026 | 1.444 |
| 0.14 | 0.035 | 1.421 |
| 0.15 | 0.045 | 1.397 |
| 0.16 | 0.055 | 1.373 |
| 0.17 | 0.066 | 1.349 |
| 0.18 | 0.077 | 1.324 |
| 0.19 | 0.09 | 1.299 |
| 0.2 | 0.103 | 1.273 |

NOTE) THICKNESS OF LIGHT TRANSMITTING LAYER IN DESIGNING THE LENS REPRESENT THE VALUE WHEN DESIGNED WITH 0.1 MM

OPTICAL RECORDING MEDIUM AND OPTICAL RECORDING AND REPRODUCING APPARATUS

BACKGROUND OF THE INVENTION

1. Field of the Invention

The present invention relates to an optical recording medium and to an optical recording and reproducing apparatus recording and reproducing information to and from the optical recording medium.

2. Description of the Background Art

A DVD (Digital Versatile Disc) has come to be practically used as an optical disk apparatus recording information with high density on an optical disk, using optical means. Further, an optical disk apparatus for high-density recording and reproduction by reducing the diameter of a laser spot converged on a recording surface of the disk by using an objective lens having high numerical aperture, as an objective lens for the DVD, has been proposed.

Generally, the diameter of the laser spot converged by an optical pickup is given by $$\lambda/NA \quad (1)$$

where $\lambda$ represents wavelength of the laser beam, and NA represents numerical aperture of the objective lens of the optical pickup.

As represented by the expression (1), by enlarging the numerical aperture (NA) of the objective lens, the laser beam is converged to attain a small diameter of the laser spot which is incident on the optical disk, whereby the recording pit on the optical disk is made smaller, enabling high-density recording and reproduction.

It is difficult, however, to manufacture a single aspheric lens used as the objective lens having the numerical aperture of not smaller than 0.6. Further, in order to attain the spherical aberration of the laser beam within a tolerable range, it becomes necessary to make thinner the light transmitting layer of the optical disk as the numerical aperture is made larger.

An objective lens system having a large numerical aperture can be implemented by such a lens structure having two or more lenses as used in a microscope, for example. Considering the size and weight of the objective lens system, it is necessary to reduce the size and weight of such a lens structure when it is to be used in the optical pickup.

An objective lens system including two lens units of two lenses structure having a large numerical aperture includes an aberration adjusting mechanism for adjusting spherical aberration, in which one of the two lenses is movable to change the space between the lenses to adjust the spherical aberration. Thus, the spherical aberration experienced in the light transmitting layer is adjusted when a disk of which light transmitting layer has a thickness other than a prescribed thickness. Particularly, it is difficult to reduce spherical aberration of two or more light transmitting layers without the aberration adjusting mechanism, in a multi-layered disk having two or more light transmitting layers and two or more recording layers for recording information.

Actually, thicknesses of light transmitting layers and refractive indexes of optical disks are various and many dependent on the material or method of manufacturing the optical disks. Further, there are optical disks having light transmitting layer of uneven thicknesses generated during manufacturing. Therefore, the thickness of the light transmitting layer and the refractive index differ disk by disk, and therefore it is necessary to perform focus adjustment and spherical aberration adjustment every time an optical disk is changed.

Japanese Patent Laying Open No. 9-251645, for example, proposes a method of spherical aberration adjustment in a system having two lens units of two lenses, in which a lens mounted on the aberration adjusting mechanism is moved forward/backward from an initial value in a prescribed period, and the distance between the two lens units is so adjusted as to attain a position where a reproduced RF signal comes to have the maximum amplitude, that is, the lens position is adjusted to such a point where spherical aberration is small.

In the above described method, however, the initial value of the lens space of the aberration adjusting mechanism determining the distance between the two units at the time of aberration adjustment is calculated from the thickness of the light transmitting layer of the optical disk and the design value of the refractive index. Actually, it is necessary to change the initial value from disk to disk, because there is the difference in thickness of the light transmitting layers, unevenness of the thickness of light transmitting layers and the difference in refractive index of the optical disks.

Further, it is impossible to correctly record and reproduce information to and from a disk of which light transmitting layer has uneven thickness along the radial direction of the disk, as the thickness of the light transmitting layer changes after spherical aberration adjustment, resulting in increased spherical aberration.

For an optical disk having no record on it, or for a disk of which reflectance changes in one track, the position where the reproduced RF signal assumes the maximum value does not always correspond to the distance between the two lens units where the spherical aberration is small, and hence aberration adjustment is not possible.

SUMMARY OF THE INVENTION

The present invention was made in view of the foregoing, and its object is to enable correct recording or reproduction of information when two lens units are used.

The above described object of the present invention can be attained by an optical recording medium in accordance with one aspect of the present invention having at least one set of a light transmitting layer and a recording layer, on which information of thickness and information of refractive index of the light transmitting layer are recorded.

Preferably, an area on which the thickness information and refractive index information of the light transmitting layer are recorded is different from a general information recording area recording general information such as sounds and video images.

Further, preferably, the thickness information of the light transmitting layer is at least one of thickness value of the light transmitting layer determined before manufacturing, thickness value of the light transmitting layer obtained after manufacturing, and unevenness of the light transmitting layer obtained after manufacturing.

Preferably, the area on which the thickness information and the refractive index information of the light transmitting layer are recorded includes a first area on which the thickness value of the light transmitting layer and the refractive index determined before manufacturing are recorded, and a second recording area on which the thickness value and the unevenness of the thickness of the light transmitting layer obtained after manufacturing are recorded.

Further, preferably, the first recording area is a recording area pre-formatted at the time of manufacturing.

Preferably, the second recording area is rewritable after manufacturing.

Further, when there are a plurality of sets of light transmitting layers and recording layers, the thickness information and the refractive index information of the light transmitting layers are preferably recorded on a recording layer of any one of the plural sets.

According to another aspect, the present invention provides an optical recording and reproducing apparatus recording and reproducing information by converging a light beam onto an optical recording medium through two lens units, wherein distance between the two lens units is adjusted based on thickness information of a light transmitting layer and refractive index information of the light transmitting layer recorded on the optical recording medium having at least one set of a light transmitting layer and a recording layer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An illustrative and not limiting description of the present invention will be provided in the following with reference to the figures.

In the following, an optical disk will be described as an example of the optical recording medium, and an optical disk apparatus will be described as an example of the optical recording and reproducing apparatus.

The optical disk in accordance with the present invention has one, or two or more information recording layers stacked on one another.

Figure 1:
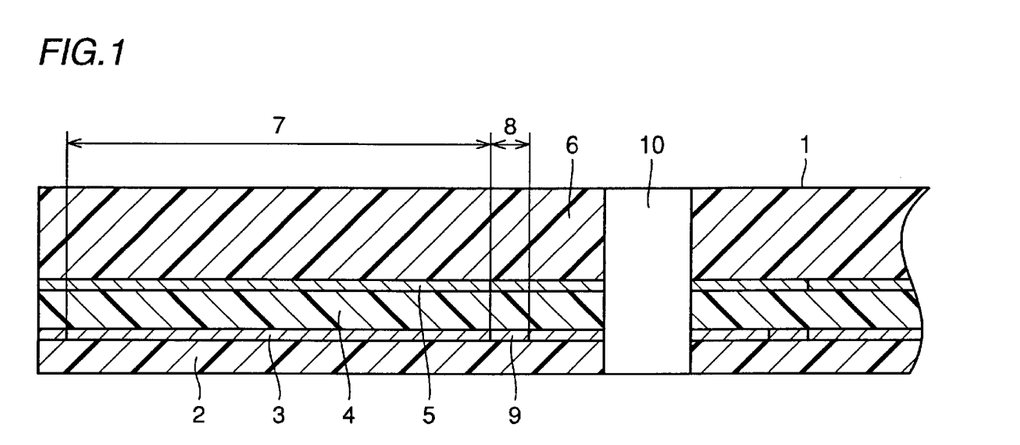
FIG. 1 is a cross section of the optical disk in accordance with the present invention.
Figure 2:
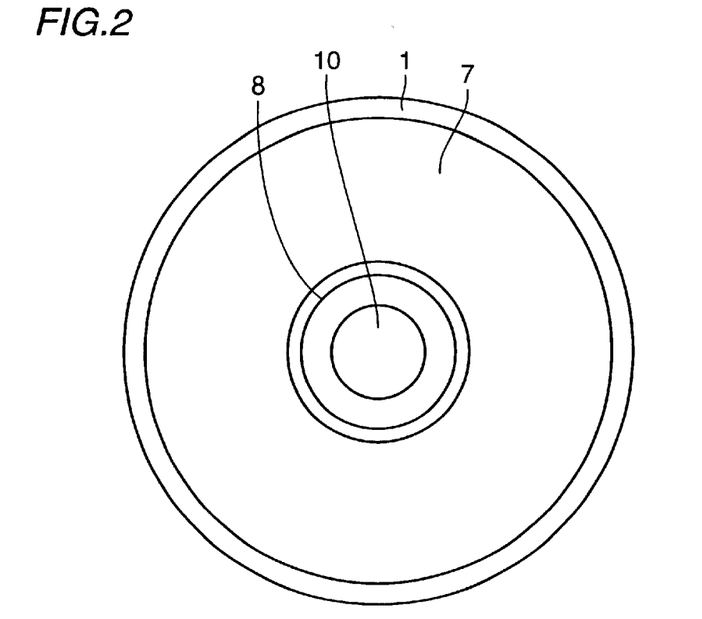
FIG. 2 is a top view of the optical disk of the present invention.

FIG. 1 is a cross section and FIG. 2 is a top view of the optical disk in accordance with the present invention. Referring to FIGS. 1 and 2, the layer recording information of optical disk 1 includes a first light transmitting layer 2, a first information recording layer 3, a second light transmitting layer 4 and a second information recording layer 5 stacked in this order from the laser beam entering side, which is adhered by an adhesive resin, on a substrate 6. Information of the thicknesses and refractive indexes of the first and second light transmitting layers 2, 4 are recorded at the time of manufacturing, in a manufacturing information recording area 8, different from a general information recording area 7.

Though a manufacturing information recording layer 9 is provided as a part of the first information recording layer 3, it may be formed as a part of the second information recording layer 5, and if there are two or more information recording layers, it may be formed as a part of any of the information recording layers.

Figure 3:
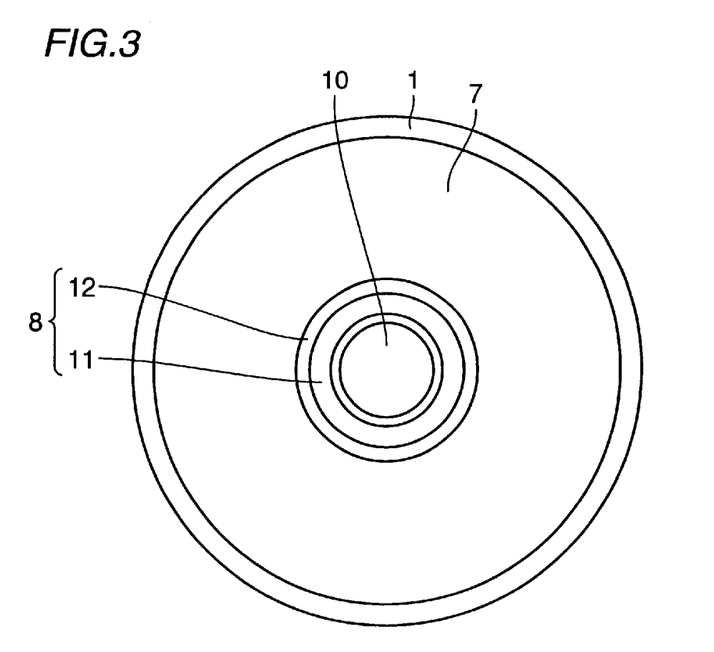
FIG. 3 is a top view of another optical disk in accordance with the present invention.

FIG. 3 is a top view of another optical disk in accordance with the present invention. Referring to FIG. 3, the information recorded on the manufacturing information recording area 8 includes pre-manufacturing information which is determined before manufacturing the optical disk, and post-manufacturing information resulting from an inspection of the optical disk after manufacturing. The manufacturing information recording area 8 is divided into a pre-manufacturing information recording area 11 and a post-manufacturing information recording area 12. Though the pre-manufacturing information recording area 11 and the post-manufacturing information recording area 12 are divided in the radial direction, these areas may be divided along the direction of the rotational angle.

Here, the pre-manufacturing information includes thickness value (specification value) of the light transmitting layer and the refractive index value of the light transmitting layer, which are recorded on pre-manufacturing information recording area 11. The pre-manufacturing information is recorded by embossment and pits, at a part of the manufacturing information recording area of an original disk, when the optical disk is manufactured. The embossment and the pits have large shapes so as to enable reading even when the laser beam converged by the objective lens system suffers from spherical aberration. Further, information of the same contents is recorded repeatedly, considering possible error in reading.

The post-manufacturing information includes an average thickness value of the light transmitting layer and an unevenness value of the thickness of the light transmitting layer along the radial direction of the optical disk, obtained through inspection of the light transmitting layer of the optical disk after manufacturing, which are recorded on the post-manufacturing information recording area 12. If the manufacturing information recording layer 9 is formed as an information recording layer allowing recording by laser beam, the post-manufacturing information is rewritable. As to the means for rewriting, a high power laser beam is used, so that the information is recorded irrevocably, in the manufacturing information recording layer 9.

The pre-manufacturing information recording area 11 may also be formed as a recordable information recording layer. Further, the pre-manufacturing and post-manufacturing information may be recorded on the manufacturing information recording area 8 with the laser power comparable to that for the general information recording area 7.

Though the unevenness value of the thickness of the light transmitting layer along the radial direction of the optical disk and average thickness value of the light transmitting layer obtained by inspection of the light transmitting layer of the optical disk after manufacturing are used as the manufacturing information, thickness values of the transmitting layer at a plurality of arbitrary positions of the optical disk may be recorded in place of the average thickness value of the light transmitting layer.

Further, at least one of the thickness value (specification value) of the light transmitting layer, the average thickness value of the light transmitting layer obtained through inspection of the light transmitting layer of the optical disk or the unevenness value of the thickness of the light transmitting layer along the radial direction of the optical disk obtained after manufacturing, may be sufficient as the thickness information of the light transmitting layer.

Figure 4:
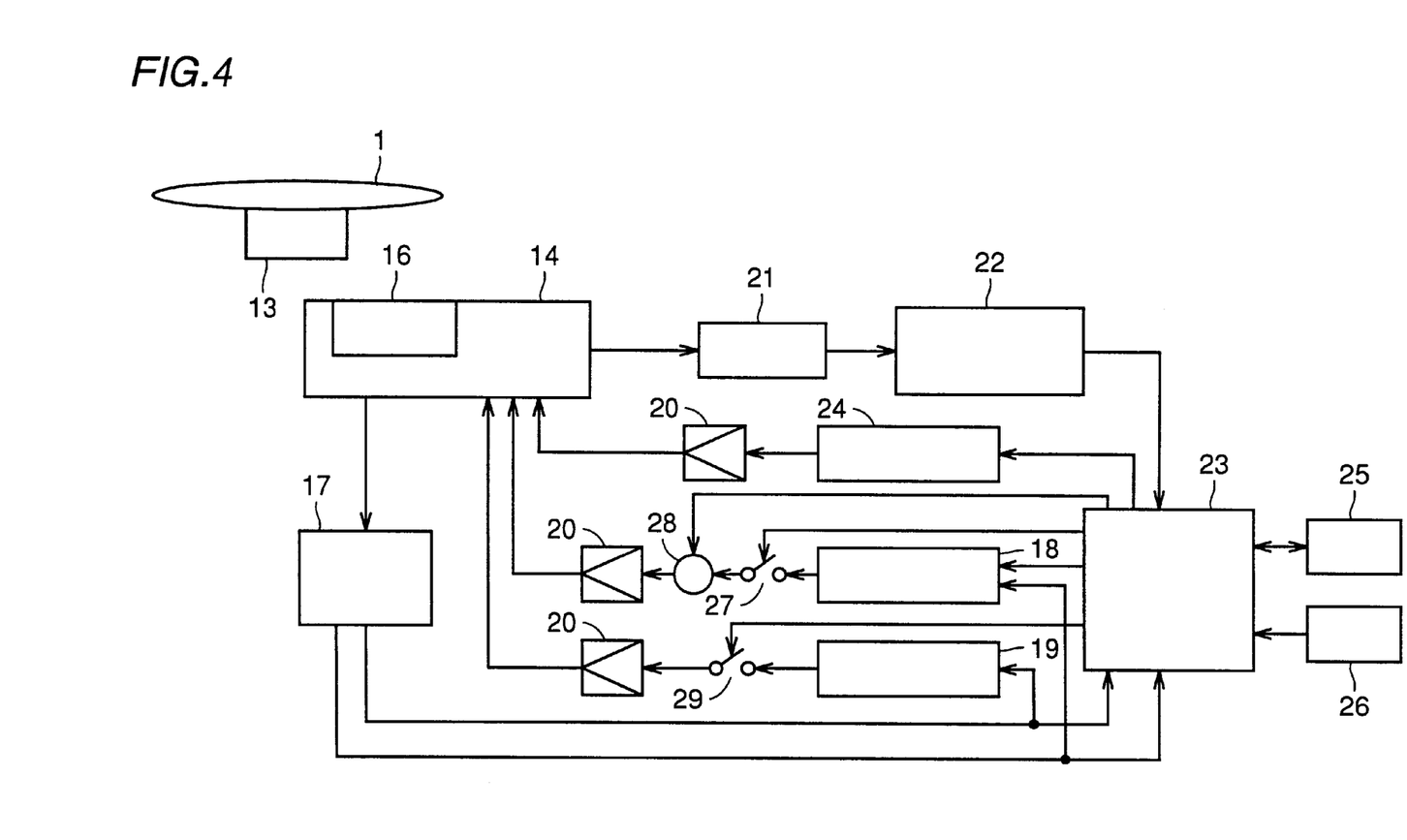
FIG. 4 is a block diagram showing a configuration of the optical disk apparatus of the present invention.

The optical disk apparatus in which the optical disk described above is used will be described in the following. FIG. 4 is a block diagram representing an exemplary configuration of the optical disk apparatus in accordance with the present invention.

Referring to FIG. 4, optical disk 1 is rotated by a spindle motor 13 at a prescribed rate.

A pickup 14 directs a laser beam to optical disk 1 to record information, or to reproduce information recorded on optical disk 1. Pickup 14 includes an actuator 16 on which objective lens system 15 is mounted, allowing movement of objective lens system 15 in the direction of focusing and in the direction of disk radius, converging laser beam from the objective lens system 15 onto optical disk 1. Though not shown, pickup 14 includes a laser diode, a beam splitter, RF and servo photo detectors, lenses and the like, which are basic components of pickup 14.

An error signal generating circuit 17 generates, from a signal from the servo photo detector contained in pickup 14, a focus error signal in accordance with astigmatism, a tracking error signal in accordance with push-pull method, and a total signal as a sum of the signals, in the present embodiment.

A focus control circuit 18 and a tracking control circuit 19 control position of objective lens system 15 mounted on actuator 16 through an amplifier 20 based on the focus error signal and the tracking error signal generated from the error signal generating circuit 17, so that the laser beam is controlled to reach a prescribed position of the recording layer of the optical disk 1.

An aberration adjusting mechanism driving circuit 24 moves one of the lens units of objective lens system 15 having two lens units to adjust the space between the two lens units, so as to adjust aberration of the laser beam incident on the optical disk 1.

An RF head amplifier 21 amplifies an RF signal detecting the information recorded on the recording layer of optical disk 1 from the RF photo detector in pickup 14, and provides the result to a signal processing circuit 22. Signal processing circuit 22 performs processing for converting the RF signal to information.

A control microcomputer 23 administers and controls the optical disk apparatus.

The optical disk apparatus further includes an RAM 25, an ROM 26, a focus loop switch 27, an adder 28 and a tracking loop switch 29. Here, recording-related circuitry, laser driving circuitry and the like are not shown.

Figure 5:
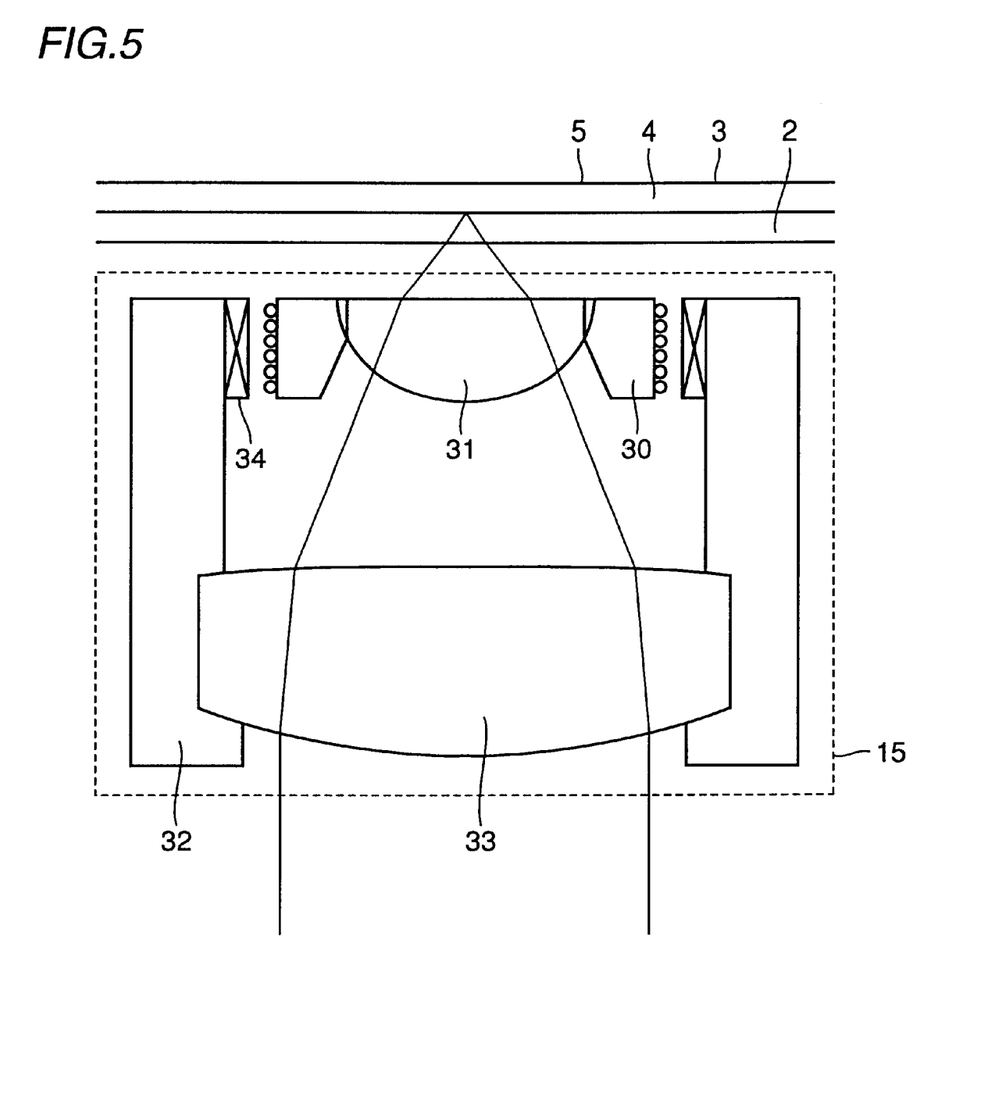
FIG. 5 is a cross section of two units of an objective lens system.

FIG. 5 shows a detailed configuration of the objective lens system portion of the actuator. Referring to FIG. 5, objective lens system 15 has a large numerical aperture and includes a first lens 31 held by a first lens holder 30 and a second lens 33 held by a second lens holder 32. Driven by aberration adjusting actuator 34, the first lens 31 is, whereby the space between the first and second lenses 31 and 33 varies, allowing aberration adjustment.

The operation of the optical disk apparatus having the above described configuration is as follows.

First, when optical disk 1 is mounted, manufacturing information recorded on optical disk 1 is taken into control microcomputer 23. The process flow of information taking will be described in the following with reference to FIG. 7.

Figure 7:
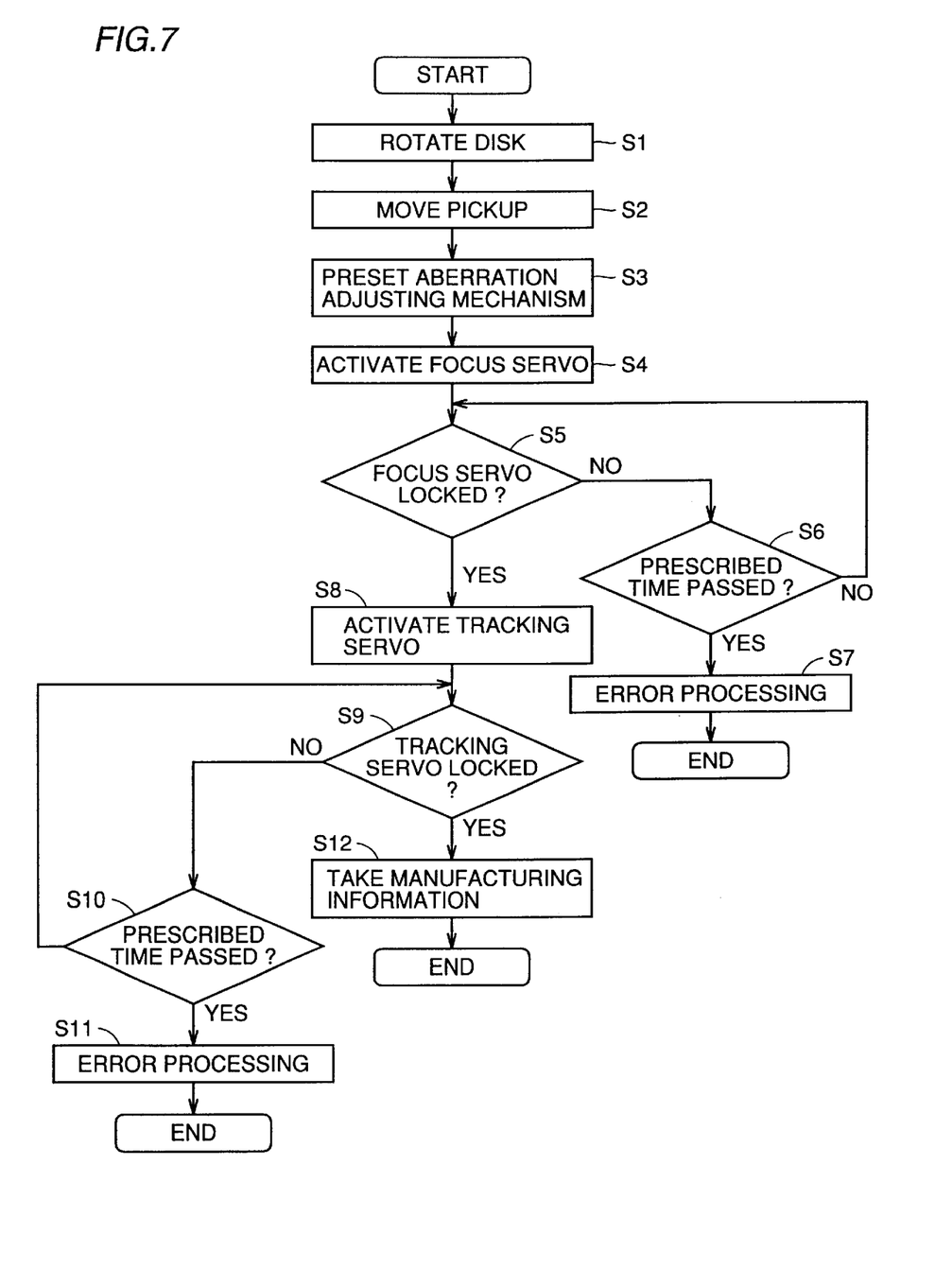
FIG. 7 is a flow chart of the process when the optical disk apparatus of the present invention is activated.

In step S1, control microcomputer 23 controls spindle motor 13, so that optical disk 1 is rotated at a prescribed rate.

Then, in step S2, control microcomputer drives a pickup feeding mechanism, so that pickup 14 is moved to the manufacturing information recording area 8 of optical disk 1.

Thereafter, in step S3, control microcomputer 23 outputs an initial value of aberration adjusting actuator 34. The initial value has been recorded in a program of control microcomputer 23, and by the aberration adjusting mechanism driving circuit 24 and the aberration adjusting actuator 34, the position of the first lens 33 is moved so that the space between the first and second lenses 31 and 33 is set to the initial value. The initial value corresponds to the central position in the movable range of the aberration adjusting actuator 34.

Thereafter, in step S4, control microcomputer 23 activates focus servo. More specifically, control microcomputer 23 generates a driving signal to drive objective lens system 15 from the farthest position from the optical disk 1 toward the optical disk 1, with focus loop switch 27 being off. The driving signal is input from adder 28, amplified by amplifier 20 and supplied to actuator 16, so that the objective lens system 15 is moved closer to the optical disk 1.

Figure 6:
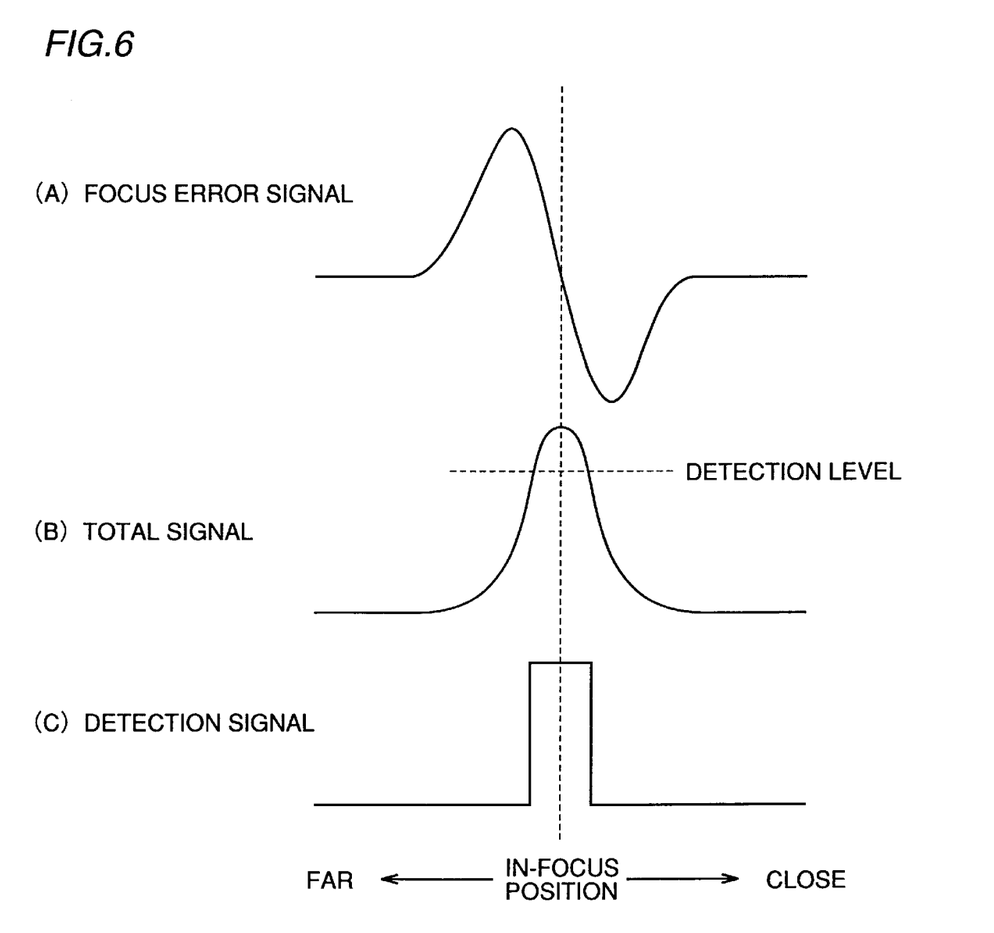
FIG. 6 is an illustration of focus servo signal.

The total signal and focus error signal of error signal generating circuit 17 are as shown in FIG. 6, dependent on the positional relation between objective lens system 15 and optical disk 1. As can be seen from (B) of FIG. 6, the total signal assumes the maximum value near the in-focus position. When the total signal value attains larger than a prescribed detection level, the error signal generating circuit 17 generates a detection signal such as shown in (C) of FIG. 6, which signal is provided to control microcomputer 23.

When the detection signal is input, control microcomputer 23 stops supply of the driving signal, and turns on focus loop switch 27. When focus loop switch 27 is turned on, in focus control circuit 18, based on the focus error signal generated by error signal generating circuit 17, a focus servo loop is formed in which an error signal which has been subjected to phase compensation and gain correction is provides to amplifier 20, actuator 16 is driven and objective lens system 15 is controlled so that it reaches the in-focus position.

In step S5, control microcomputer 23 determines, based on the detection signal generated in step S4, whether the focus servo is locked or not. If it is not locked, the process of step S4 is repeated. After a prescribed time period, whether the focus servo is locked or not is determined in the similar manner, and if it is not locked, the error processing of step S7 is performed, and the operation is stopped.

When it is locked in step S5, the flow proceed to step S8 where control microcomputer 23 monitors the focus error signal output from error signal generating circuit 17, and, at a timing of level zero-cross, turns on the tracking loop switch 29. As a result, based on the tracking error signal generated by error signal generating circuit 17, in tracking control circuit 19, tracking servo loop is formed in which the error signal which has been subjected to phase compensation and gain correction is output to amplifier 20, actuator 16 is driven and the objective lens system 15 is moved to the central position of the track.

Thereafter, in step S9, control microcomputer 23 monitors the level of the tracking error signal so as to determine whether the focus servo is locked or not, by determining whether the level of the tracking error signal is within the prescribed range, and if it is not locked, the process of step S8 is repeated. After a prescribed time period, whether the tracking servo is locked or not is determined in the similar manner, and if it is not locked, the error processing of step S11 is performed and the operation is stopped.

In step S12, the manufacturing information recorded on optical disk 1 is input to signal processing circuit 22 through RF amplifier 21. Signal processing circuit 22 demodulates the input RF signal to manufacturing information, and provides the manufacturing information to control microcomputer 23.

Through the above described process steps, the manufacturing information recorded on manufacturing information recording area 8 of optical disk 1 is taken in the control microcomputer 23.

Control microcomputer 23 stores the taken manufacturing information to RAM 25. The manufacturing information to be stored includes the specification value of the thickness of the light transmitting layer, the refractive index of the light transmitting layer, and the average thickness value and thickness unevenness along the radial direction of optical disk 1 obtained as a result of inspection of thickness, after manufacturing of optical disk 1.

Figure 8:
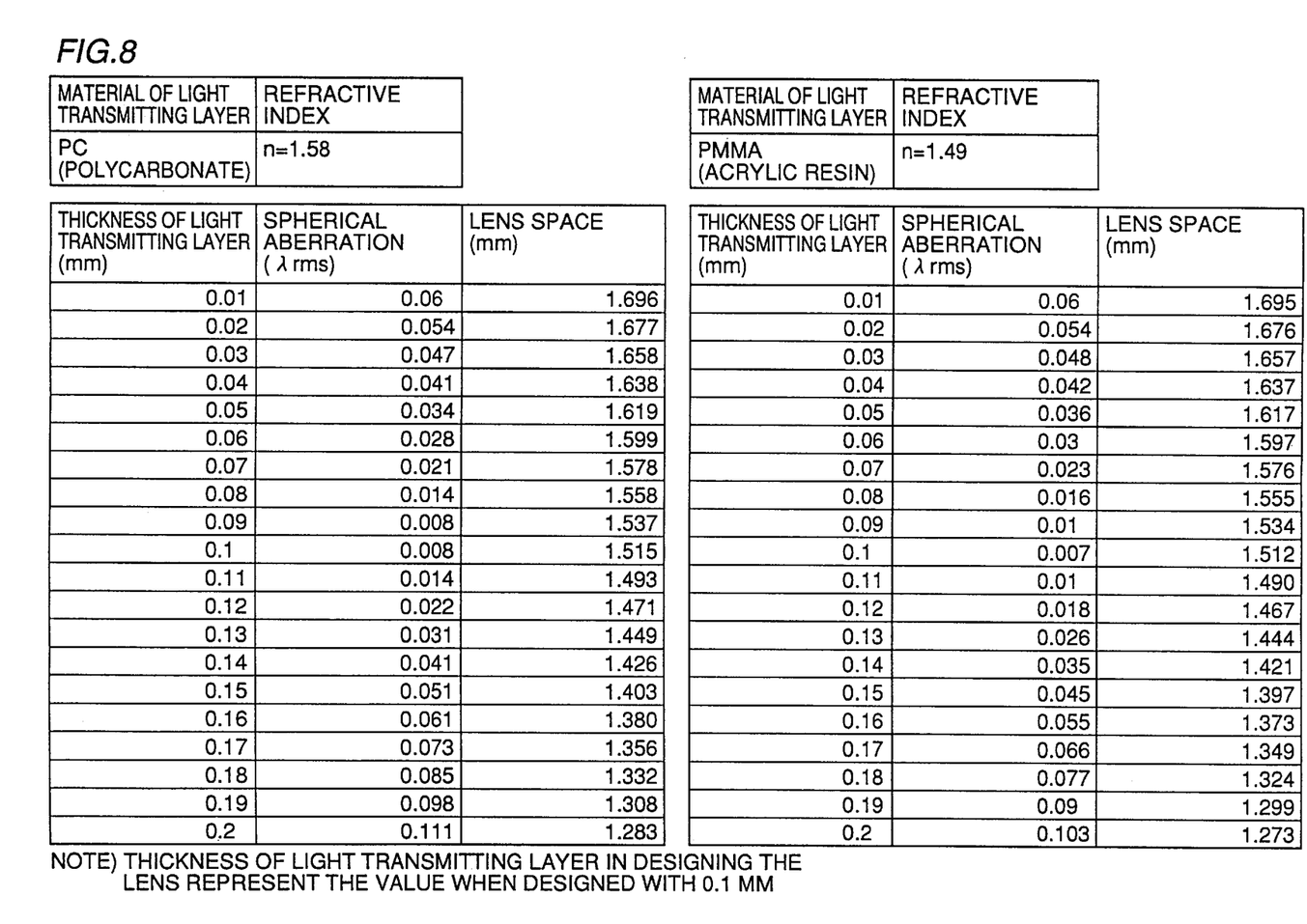
FIG. 8 include data tables representing optimal space between two units of lenses when thickness and refractive index of the light transmitting layer vary.

The optimal space between the two lens units at which the spherical aberration is small for different thicknesses of light transmitting layers and materials having different refractive indexes can be calculated when the objective lens system 15 having two lens units is designed. Therefore, the optimal spaces for different thicknesses or different refractive indexes may be programmed in control microcomputer 23, stored in the form of a data table of optimal spaces between two lens units with the thickness and refractive index of the light transmitting layer varied, or in the form of an approximation equation, in ROM 26. FIG. 8 includes data tables representing the optimal spaces between the two lens units, when the thickness and the refractive index of the light transmitting layer vary, recorded in ROM 26.

Based on the taken data of manufacturing information, control microcomputer 23 provides a driving value to the aberration adjusting actuator 34 that attains the optimal space between the two lens units at which the spherical aberration is small, in accordance with the optimal space value programmed in control microcomputer 23 or the data table or the approximation equation for the optimal space between the two lens units stored in ROM 26.

When the driving value for the aberration adjusting actuator 34 is given, the aberration adjusting actuator 34 is driven by aberration adjusting mechanism driving circuit 24 and amplifier 20, so that the first lens 31 is moved and the space between the first and second lenses 31 and 33 is adjusted to reduce spherical aberration.

Thereafter, in step S2, control microcomputer 23 drives a pickup feeding mechanism, so that the pickup 14 is moved to a track position for recording or reproduction, in the general information recording area 7 of optical disk 1.

Control microcomputer 23 calculates the radius of optical disk 1 from the track on which recording or reproduction is to be performed, and takes out the thickness information of the track to be used, from RAM 25 storing the thickness information of the light transmitting layer of the track.

Then, by the programming of control microcomputer 23, or from the data table or approximation equation of the optimal space between the two lens units stored in ROM 26, a driving value for the aberration adjusting actuator corresponding to the optimal space between the two lens units is output, and the space between the two lens units is adjusted.

Description of the focusing operation and the tracking operation will not be repeated, as the description is already given with reference to steps S4 to S11 of FIG. 7.

When the focusservo and tracking servo are locked, information is recorded on the recording layer or information is reproduced from the recording layer, of the track of optical disk 1, by a laser beam of which aberration is adjusted by the objective lens system including two lens units.

Though aberration is adjusted by the objective lens system having two lens units, similar effects can be obtained through aberration adjustment by adjusting the space between a collimator lens and an objective lens system including one unit of lenses.

According to the optical recording medium of the present invention, the thickness information of the light transmitting layer and the refractive index information of the light transmitting layer are recorded in advance on the optical recording medium. Therefore, the spherical aberration of the laser beam incident on the optical recording medium can be adjusted medium by medium, enabling correct recording or reproduction of information.

Further, in the optical recording and reproducing apparatus in accordance with the present invention, the space between two lens units is adjusted based on the thickness information of the light transmitting layer and the refractive index information of the light transmitting layer recorded on the optical recording medium. Therefore, the spherical aberration of the laser beam incident on the optical recording medium can be adjusted medium by medium, enabling correct recording or reproduction of information.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical recording medium having at least one set of a light transmitting layer and a recording layer, wherein thickness information and refractive index information of said light transmitting layer are recorded.

2. The optical recording medium according to claim 1, wherein an area on which said thickness information and said refractive index information of said light transmitting layer are recorded is different from a general information recording area recording general information.

3. The optical recording medium according to claim 1, wherein said thickness information is at least one of thickness value of said light transmitting layer determined before manufacturing, thickness value of said light transmitting layer obtained after manufacturing and unevenness of thickness of said light transmitting layer obtained after manufacturing.

4. The optical recording medium according to claim 1, wherein an area on which said thickness information and said refractive index information of said light transmitting layer are recorded includes a first recording area on which thickness value and refractive index of said light transmitting layer determined before manufacturing are recorded, and a second area on which thickness value and unevenness in thickness of said light transmitting layer obtained after manufacturing are recorded.

5. The optical recording medium according to claim 4, wherein said first recording area is a recording area preformatted during manufacturing.

6. The optical recording medium according to claim 4, wherein said second recording area is a recording area rewritable after manufacturing.

7. The optical recording medium according to claim 1, having a plurality of sets of said light transmitting layer and said recording layer, wherein said thickness information and said refractive index information of said light transmitting layer is recorded in said recording layer of any of said plurality of sets.

8. An optical recording and reproducing apparatus for recording and reproducing information by converging light beam through two lens units onto an optical recording medium, wherein based on thickness information and refractive index information of a light transmitting layer recorded on an optical recording medium having at least one set of the light transmitting layer and a recording layer, distance between said two lens units is adjusted.

* * * * *